United States Patent [19]

Heybourn et al.

[11] Patent Number: 4,653,631
[45] Date of Patent: Mar. 31, 1987

[54] CONVEYOR SYSTEM FOR ROD-LIKE ARTICLES

[75] Inventors: Frank Heybourn; David C. M. Carter; Allen F. Griffiths, all of Milton Keynes, England

[73] Assignee: Molins PLC, London, England

[21] Appl. No.: 408,807

[22] Filed: Aug. 17, 1982

[30] Foreign Application Priority Data

Aug. 19, 1981 [GB] United Kingdom ................ 8125269

[51] Int. Cl.$^4$ ........................ B65G 1/04; B65G 37/00
[52] U.S. Cl. ..................................... 198/778; 198/347
[58] Field of Search ................................ 198/347, 778

[56] References Cited

U.S. PATENT DOCUMENTS

| | | | |
|---|---|---|---|
| 1,523,971 | 1/1925 | Johnsen | 198/778 X |
| 4,171,044 | 10/1979 | Rossio | 198/834 |
| 4,339,025 | 7/1982 | McCombie | 198/778 X |
| 4,344,445 | 8/1982 | Seragnoli | 198/778 X |

FOREIGN PATENT DOCUMENTS

| | | | |
|---|---|---|---|
| 1385156 | 5/1964 | France | 198/778 |
| 1453191 | 10/1967 | United Kingdom . | |
| 1090630 | 11/1967 | United Kingdom . | |
| 1299175 | 11/1969 | United Kingdom . | |
| 1299174 | 12/1972 | United Kingdom . | |
| 2007179 | 5/1979 | United Kingdom . | |

*Primary Examiner*—Robert J. Spar
*Assistant Examiner*—Stuart J. Millman
*Attorney, Agent, or Firm*—Antonelli, Terry & Wands

[57] ABSTRACT

A conveyor system principally for use as a variable capacity reservoir for rod-like articles such as cigarettes in stack formation, comprises a series of partly overlapping wheels (202, 204, 206, 208) supporting a laterally flexible conveyor (200). The wheels define an inclined generally helical path for the conveyor and are partly inclined in the same direction as the conveyor. The inclination of each wheel is set by pairs of rollers (234, 236) which engage the periphery of each wheel.

29 Claims, 11 Drawing Figures

CONVEYOR SYSTEM FOR ROD-LIKE ARTICLES

This invention relates to a conveyor system for rod-like articles such as cigarettes or cigarette filter rods.

It is common in the tobacco industry to transport cigarettes and similar rod-like articles as a substantially continuous stream in multi-layer stack formation with the articles arranged transverse to the direction of conveyance. The McCombie U.S. Pat. No. 4,339,025 discloses a laterally flexible conveyor for supporting such a stream and an arrangement for guiding the conveyor on a helical path, particularly for use as a reversible reservoir for rod-like articles. The present invention relates to a conveyor system having some similarities with that disclosed in the McCombie patent.

According to one aspect the invention provides a conveyor system for rod-like articles, comprising a laterally flexible conveyor having a support surface for rod-like articles in stack formation, and a plurality of spaced laterally curved guide members defining a path for the conveyor, said members being arranged at different levels and being at least partially inclined in the direction of the conveyor extending between them. Preferably at least successive guide members partly overlap; the inclination of the guide members is preferably variable. The members are preferably rotatable and may comprise wheels (including discs). In this case the axis of inclination as well as its amount may be variable. Thus, for example, the members may comprise wheels carrying the conveyor adjacent their outer peripheries, each wheel being supported at its center on a tilting bearing mounted on a vertical post. Where the members comprise wheels or discs or the like these may be partly overlapping with the conveyor extending around their outer peripheries in a generally helical path. Thus the system may comprise a series of stacked partly overlapping inclined rotatable members, the conveyor extending around the members and progressing upwards or downwards.

According to another aspect the invention provides a conveyor system including a laterally flexible conveyor having a support surface for rod-like articles in stack formation, and a plurality of partly superposed curved guide members defining an inclined path for said conveyor. Preferably the path is generally helical. The guide members may be arranged such that the path is inclined between the guide members or on the guide members or, preferably, both between and on the guide members. Each member may comprise a rotatable member such as a wheel or disc, preferably arranged such that its inclination (and axis of inclination is variable). The preferred axis of inclination is the radial bisector of the sector of the wheel or disc with which the conveyor makes contact. The amount of inclination is normally determined by the clearance required between overlapping portions of the wheels or discs.

In a preferred arrangement a conveyor system comprises a series of rotatable guide members arranged with their centers of curvature on a helical path, every nth guide member in vertical alignment and spaced by the required pitch for the conveyor, the conveyor passing around part of the outer circumference of each member and describing a generally helical path. Thus the system may be regarded as comprising a plurality of superposed layers, each layer having n guide members.

The laterally flexible conveyor preferably comprises a zig-zag plastic member defining a support surface and a tensioning member such as a chain. The conveyor may be constructed, and mounted on guide members, substantially as described and illustrated in the aforementioned McCombie patent. The conveyor is preferably endless and may be driven through a rotatable guide member (as in said McCombie patent) or through a sprocket or other suitable drive engaging the chain or other tensioning member.

The conveyor system of the invention may be used unidirectionally, for elevating (or lowering) a stream of articles, or as a reversible reservoir in a manner similar to Molins OSCAR reservoir.

The term "generally helical path" and similar terms used herein are intended to include paths which do not progress at a constant inclination and do not have well-defined axes. For example, the path may have transitions, straight portions and curves which are not particular.

The invention will be further described, by way of example only, with reference to the accompanying diagrammatic drawings, in which.

Figure 1:
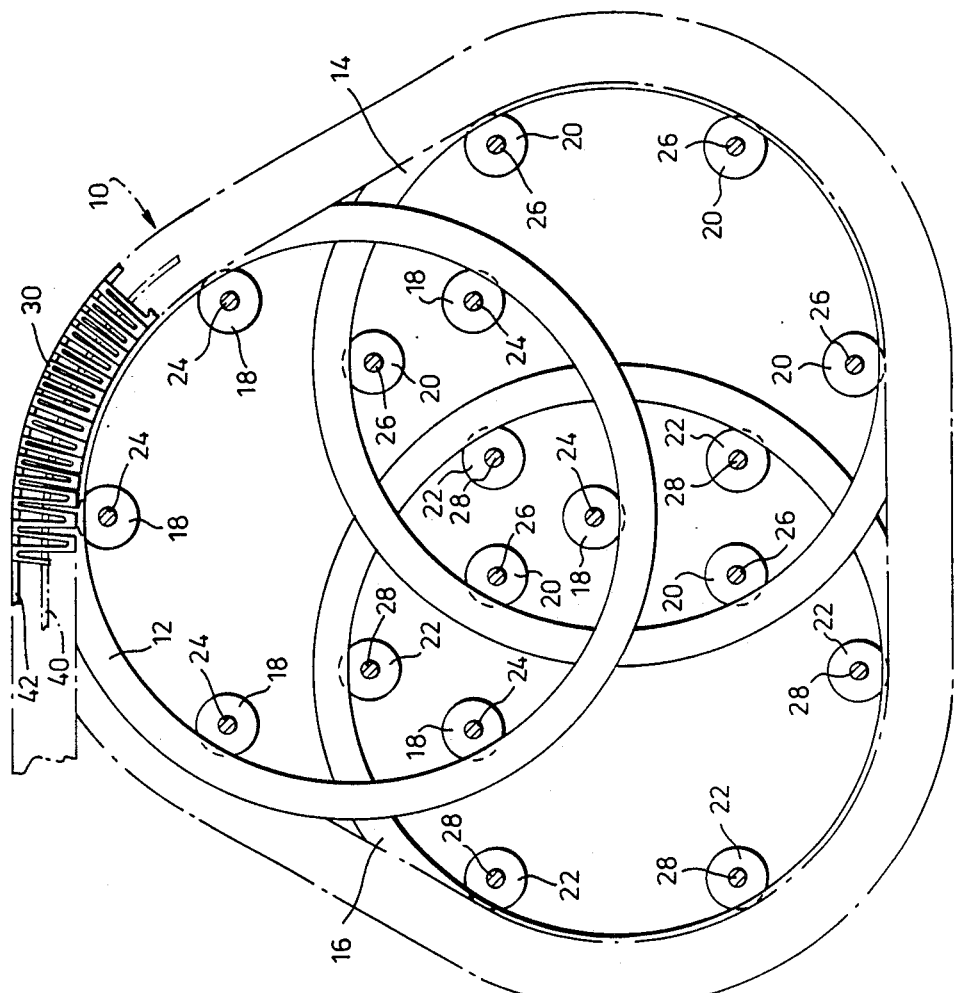
FIG. 1 is a plan view of a conveyor for rod-like articles.
Figure 6:
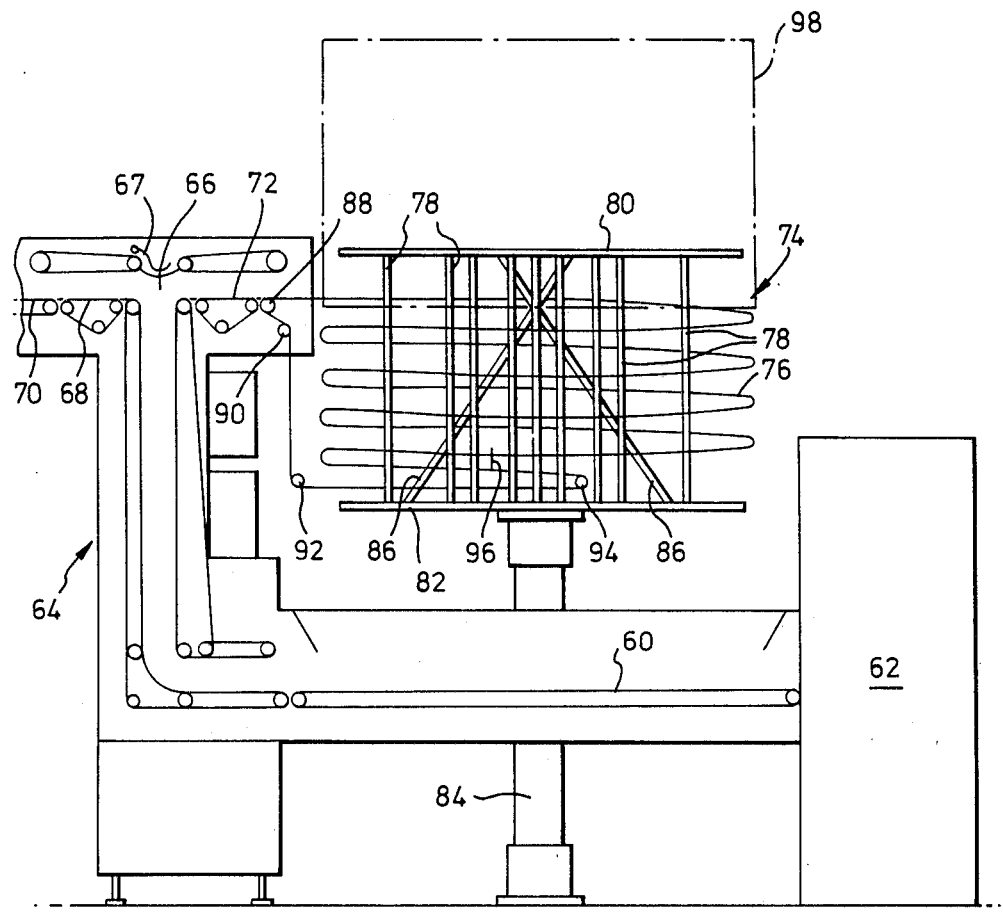
Figure 7:
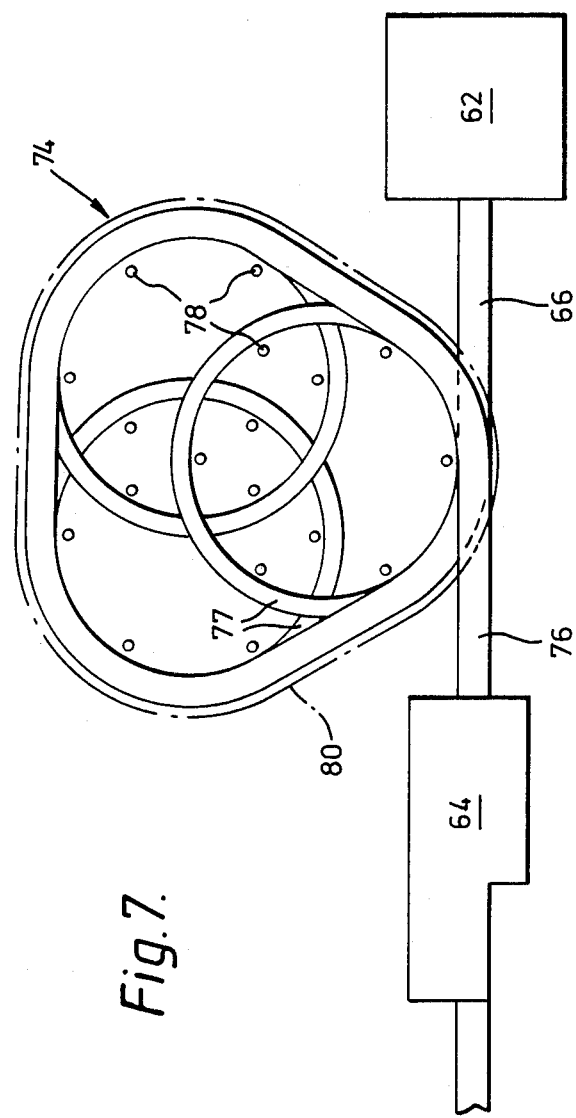
Figure 8:
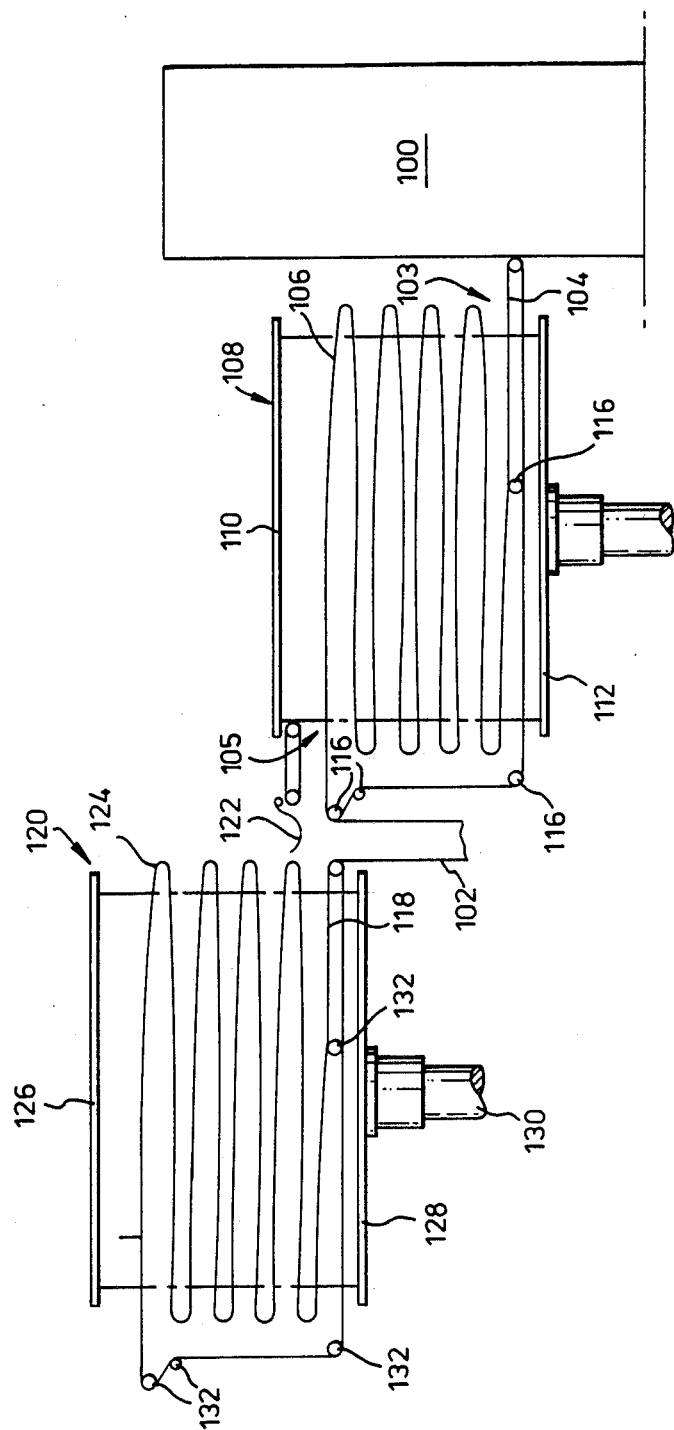
Figure 9:
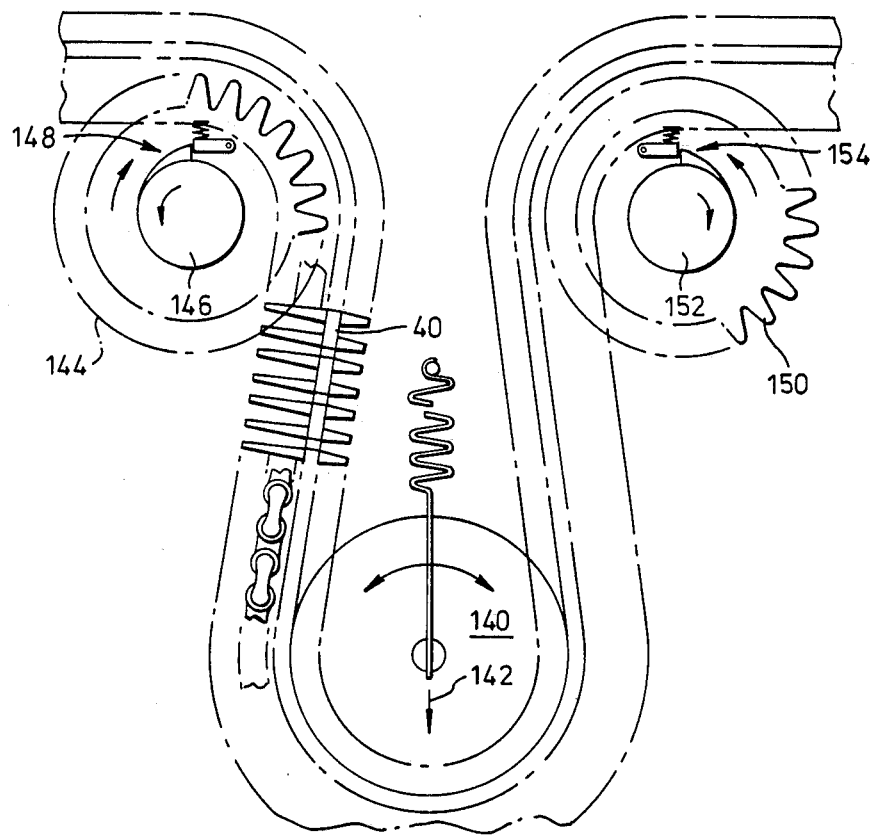
Figure 10:
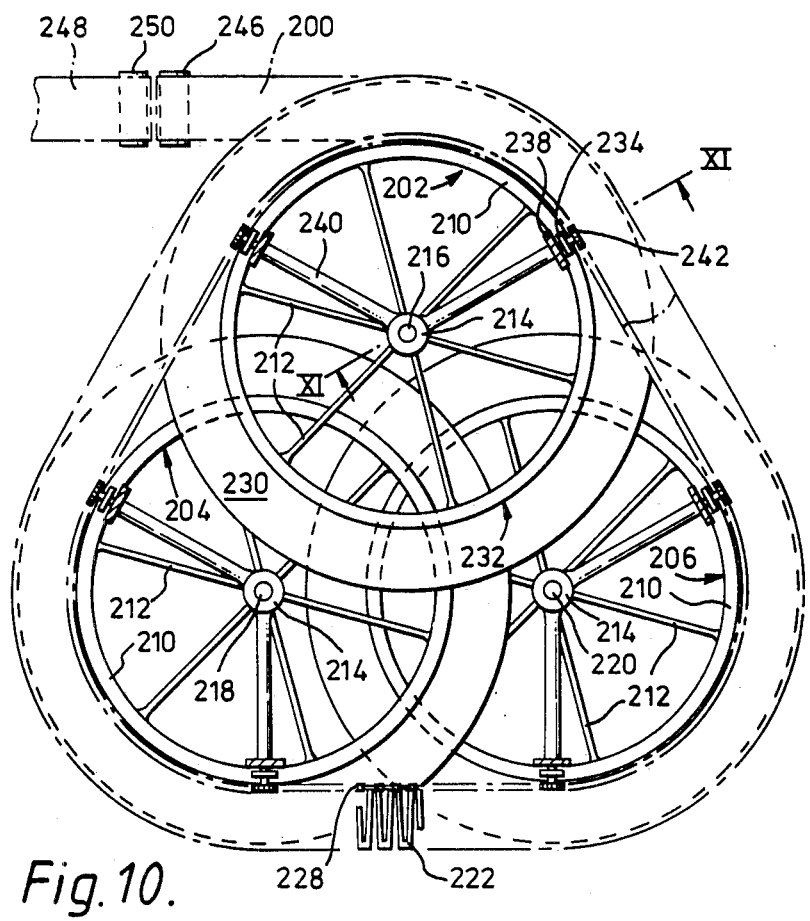
Figure 11:
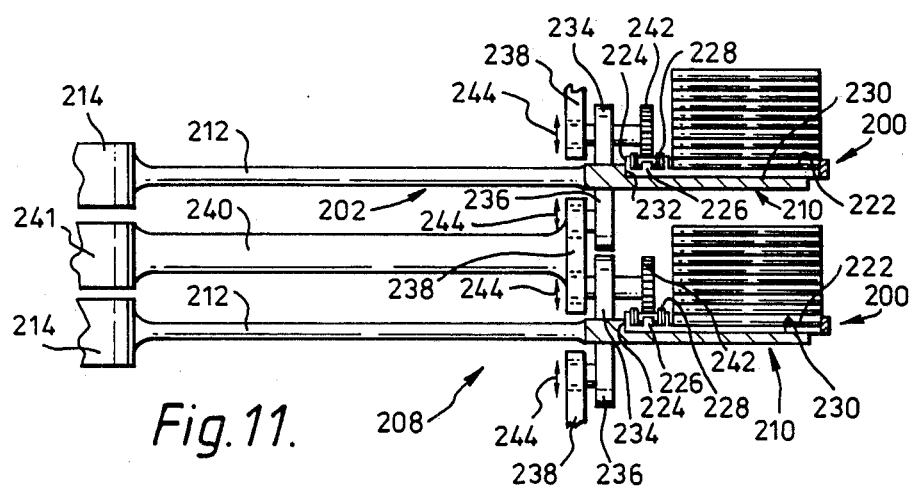

FIG. 6 is a side view of a conveyor system incorporating the conveyor of FIG. 1, FIG. 7 is a plan view of the conveyor system of FIG. 6, FIG. 8 is a side view of another conveyor system incorporating the conveyor of FIG. 1, FIG. 9 is a side view of a drive arrangement for the conveyor of FIG. 1, FIG. 10 is a plan view of another conveyor system for rod-like articles, and FIG. 11 is a sectional view on the line XI—XI of FIG. 10.

FIG. 1 shows a laterally flexible conveyor 10 supported and guided on a series of annular discs, three of which are shown 12, 14, and 16. The disc 12 is supported on six bearings 18 rotatably fixed to six vertical posts 24. Similarly the discs 14 and 16 are respectively each mounted on six bearings 20 and 22 rotatably fixed to six vertical posts 26 and 28. The discs 12, 14 and 16 are equally spaced around a central vertical axis and partially overlap, the disc 14 being lower than the disc 12 and the disc 16 being lower than the disc 14. The conveyor 10 therefore descends as it passes from the disc 12 to the disc 14 and from the disc 14 to the disc 16.

Figure 2:
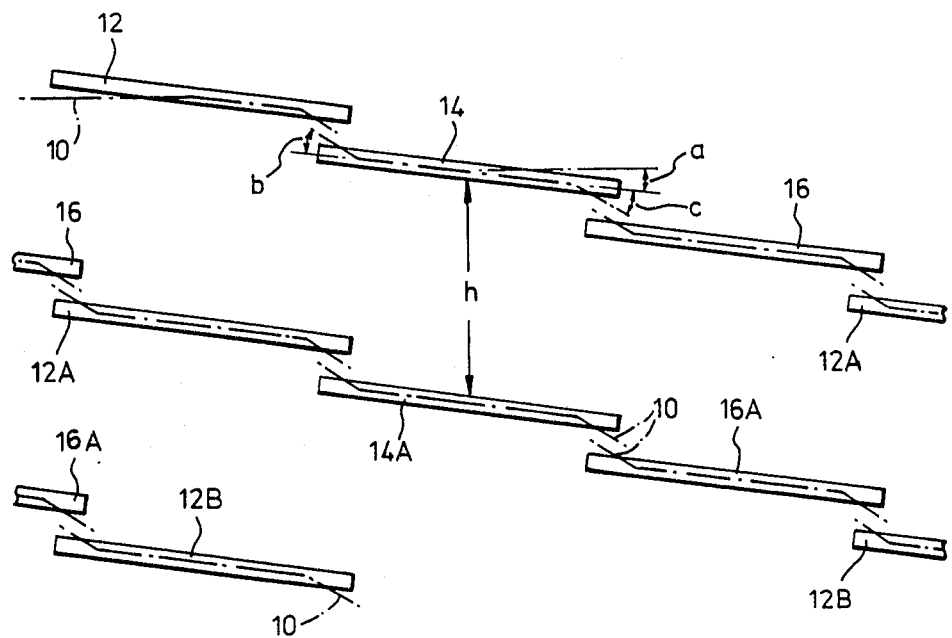
FIG. 2 is a projected side view of the conveyor of FIG. 1.

The discs 12, 14 and 16 define a layer of the path of the conveyor 10. Referring also to FIG. 2, which is a projected side view of the path of the conveyor 10, further layers of discs 12A, 14A, 16A, 12B etc. are arranged below the first layer of discs 12, 14, 16, and are similarly supported in bearings on the respective posts 24, 26 and 28. For reasons of clarity the posts 24, 26 and 28 are not shown in FIG. 2.

As shown particularly in FIG. 2, each disc 12, 14, 16 etc. is inclined to the horizontal at a small angle a in the direction of fall of the conveyor 10. The conveyor 10 makes an angle b with a disc as it descends onto it and an angle c as it leaves the disc. If the axis of inclination of each disc 12 etc. is the radial bisector of the arc of contact of the conveyor 10 with the disc the angles b and c for each disc can be equal. The vertical spacing between each layer of discs 12 etc. is h.

Typical dimensions are: the diameter of each disc 12 etc. is 1000 mm; the width of the conveyor 10 is 110 mm.; the spacing h is 115 mm; the angle a is 1.75°; the angles b and c are 0.09°.

It will be appreciated that FIG. 2 is not to scale and is not a true circular projection. In such a projection the discs 12, 14 and 16 and the path of conveyor 10 are curved.

Figure 3:
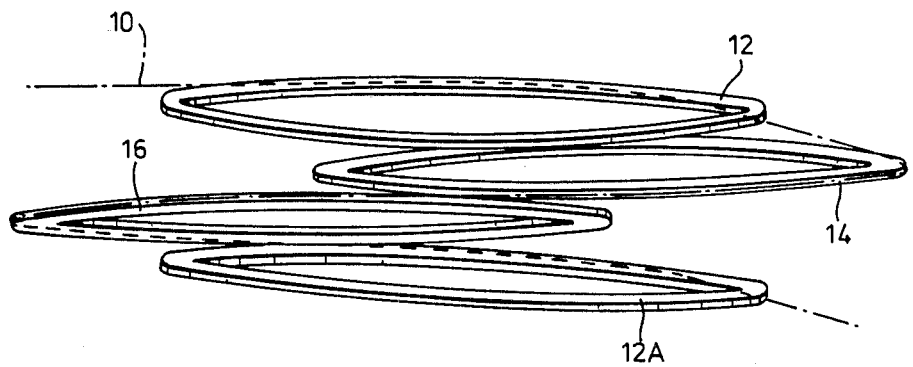
FIG. 3 is a perspective side view of part of the conveyor of FIG. 1.

FIG. 3 attempts to show the path of the conveyor 10 in perspective; as with FIG. 2 the posts 24, 26 and 28 have been omitted for clarity.

Figure 4:
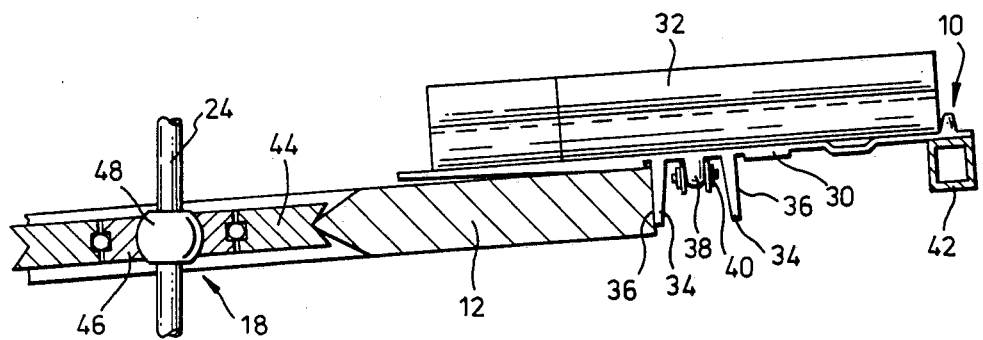
FIG. 4 is a transverse section of the conveyor of FIG. 1.

FIGS. 1 and 4 show the construction of the conveyor 10, comprising interlocking zig-zag sections 30 defining a support surface for cigarettes 32 in stack formation. Each section 30 has a series of pairs of projections 34 defining bearing surfaces 36 which are substantially perpendicular to the support surface. Each section 30 also carries at least one central lug 38 to which is attached a tensioning chain 40. The tension in the chain 39 urges the inner bearing surface 36 against the outer surface of each disc 12, the under surface of the adjacent inner part of the section 30 resting on the upper surface of the disc. Outer stationary curved guide members 42, which may be supported by external frame members or by outriggers extending from one or more of the vertical posts 24, 26, 28, may be provided. The construction and operation of the conveyor 10 and its support of the discs 12 etc. is substantially similar to that of the conveyor 602 and flanges 603, 606 disclosed in said McCombie patent.

As shown in FIG. 4 the inner circumference of the disc 12 is tapered and engages a peripheral recess in an outer ring 44 of the bearing 18. The outer ring 44 is carried by an inner ring 46 which is itself mounted on a part-spherical bearing 48 connected to the vertical post 24. The other discs 14, etc., are mounted in a similar way. Each disc 12 etc. is shown supported by six equally spaced bearings 18. Fewer or more bearings 18 could be used although there should be at least three for each disc. Bearings for different discs in the same layer could be carried by common posts positioned close to the periphery of each of the discs.

Figure 5:
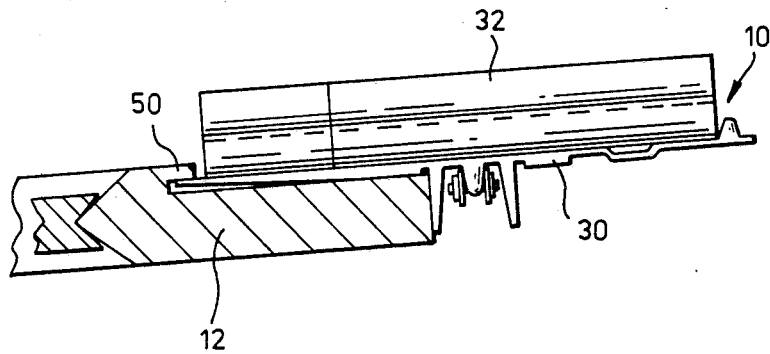
FIG. 5 is a transverse section of a modified conveyor.

The tension in the chain 40 may be sufficient to locate the conveyor 10 firmly against the discs 12 etc. with sufficient force to support the weight of a stack of cigarettes 32 on the conveyor surface without the need for an outer guide and support 42. Where additional support is required, however, this may be provided in accordance with the arrangement shown in FIG. 5 where the conveyor 10 is supported by a modified disc 12 having an upper flange 50 under which the inner side of the conveyor 10 engages.

FIGS. 6 and 7 show a system in which a conveyor 60 receives filter cigarettes from the inspector of a filter cigarette assembling machine 62 and delivers them in stack formation to the bottom of an elevator unit 64, which may be a Molins MFE unit or constructed substantially in accordance with the disclosure of British Patent Specification No. 1453191. At the top of the elevator unit 64 is a T-junction 66 having a first substantially horizontal branch comprising conveyors 68, 70 leading to a packing machine for cigarettes. A second, opposed horizontal branch includes a conveyor 72 leading to a reservoir 74 comprising a conveyor 76 substantially similar to the conveyor 10 of FIG. 1. A sensor 67 is provided over the junction 66.

The conveyor 76 is supported on discs 77 (FIG. 7) and vertical posts 78 in a manner similar to that of the conveyor 10 of FIG. 1. The posts 78 are connected to upper and lower plates 80, 82, the lower plate being supported on a stand 84. The upper and lower plates 80, are additionally braced by diagonal struts 86 which are positioned so that they do not interfere with the conveyor 76 or discs 77. The conveyor 76 is endless and passes around pulleys 88–94, one or more of the pulleys 88, 92, 94 drivingly engaging the chain of the conveyor, so that the conveyor may be driven by said one or more pulleys.

The reservoir acts as a buffer store for cigarettes passing from the machine 62 to the packing machine. The reservoir 74 is loaded or unloaded with a stream of cigarettes in stack formation by driving the conveyors 72 and 76 in directions away from or towards the junction 66 under control of the sensor 67. The control and operation of the reservoir 74 may be substantially similar to that of Molins OSCAR reservoir or as described in the aforementioned McCombie patent. In particular the conveyor 76 is provided with an end wall 96, corresponding to the end wall 600 of said McCombie patent, for bounding the leading end of the stack of cigarettes in the reservoir 74.

The reservoir 74 is located at or below the level of the junction 66 so that a stream of cigarettes advancing into the reservoir progressively descends to a lower level. A modified reservoir could be positioned as indicated in FIG. 6 at 98 and provided with a lower inlet instead of an upper inlet, so that a stream advancing into the reservoir progressively rises into it instead of descending.

In FIG. 8 a machine 100 for producing filter rod lengths is shown connected to a chute 102 forming the inlet of a pneumatic filter rod transporting system, such as Molins APHIS, by conveyors 104 and 106. The conveyor 106 forms part of a conveyor unit 108 and is supported on discs in a manner similar to that of the conveyor 10 of FIG. 1 and the conveyor 76 of FIG. 6. In particular the conveyor unit 108 includes upper and lower plates 110, 112, a support stand 114, and pulleys 116.

The conveyor unit 108 differs from the reservoir 74, however, in that the conveyor 106 is driven unidirectionally from an inlet 103 adjacent the end of conveyor 104 to an outlet 105 adjacent the upper end of the chute 102. The unit 108 therefore constitutes an elevator for filter rods issuing from the machine 100, and also acts as a delay line for the rods as a result of the increased path length of conveyor 106 compared with a conventional elevator or other relatively direct path between the machine 100 and the chute 102. It would be possible for a conveyor unit similar to the unit 108 to be driven unidirectionally from an upper inlet towards a lower outlet, so that a stack of articles would be lowered by the unit instead of elevated.

At the upper end of the chute 102, opposite the exit from the conveyor unit 108, is a conveyor 118 leading into a reservoir 120. A sensor 122 is provided at the junction of the unit 108, reservoir 120 and chute 102. The reservoir 120 comprises a conveyor 12, upper and lower plates 126, 128, support stand 130, and pulleys 132. The reservoir 120 is substantially similar to the reservoir 74 of FIG. 6 except that its inlet is at the bottom instead of the top. Operation of the reservoir 120, under control of the sensor 122, is substantially the same as that of the reservoir 74.

The system of FIG. 8 therefore provides a delay line a reservoir facility for filter rods passing from a filter rod making machine 100. For further details of operation of such a system reference is directed to British Patent Specification No. 2007179.

It is important that the chain 40 of the conveyor 10 (or any similar conveyor) is maintained in tension so that the conveyor is firmly located on each annular disc 12 etc. The total path length around the discs 12 etc. may vary slightly as the conveyor 10 moves, as a result of eccentricities in diameter of the discs for example. FIG. 9 shows an arrangement whereby the chain 40 may be reversibly driven and maintained in tension. The arrangement comprises a pulley 140 engaging the support surface of the sections 30 and resiliently loaded in the direction indicated by the arrow 142 to take up slack in the chain 40. On one side of the pulley 140 the chain passes around first sprocket 144 which is connected to a drive shaft 146 by a ratchet mechanism 148 arranged such that the sprocket 144 is drivable in a clockwise direction. On the other side of the pulley 140 is a second sprocket 150 connected to a drive shaft 152 by a ratchet mechanism 154 so that the sprocket 150 is drivable in a counterclockwise direction.

Thus, when it is required to move the conveyor 10 and chain 40 in a direction from left to right as viewed in FIG. 9 the shaft 146 is driven clockwise to drive the sprocket 144. When the shaft 146 is driven the shaft 152 may be allowed to free-wheel but is preferably driven in the same direction and at the same speed as the shaft 146. Similarly when it is required to drive the chain 40 from right to left the shaft 152 is driven counterclockwise and the shaft 146 is similarly driven or allowed to free-wheel. The tensioning pulley 40 is able to take up slack by movement of the chain 40 around either sprocket 144 or 150 relative to its respective drive shaft, even when that drive shaft is being driven, virtue of the ratchet mechanisms 148, 154. By providing tensioning immediately downstream of the drive pulley, irrespective of direction of movement of the conveyor 40, the conveyor responds positively to reversals of direction of movement since the tensioner is never on the driven side of the conveyor. The tension applied by the pulley 140 is therefore largely independent of the torque requirements of the driven pulleys 144 or 150 and the tension upstream of the driven pulley.

While the driving connections between the shafts 146, 152 and the respective pulleys 144, 150 have been shown as ratchet mechanisms 148, 154 other arrangements, such as wrap spring clutches for example, could be used.

FIGS. 10 and 11 show another conveyor system for rod-like articles which is capable of operation in the same manner and of incorporation in the same systems as that of FIG. 1 but which has a different construction.

A laterally flexible conveyor 200 passes around a number of layers of partially superposed discs or wheels 202, 204, 206, and 208 (FIG. 11). Each of these wheels has a rim 210, spokes 212, and a hub 214 containing a tilting bearing rotatably supported on one of the spaced substantially vertical shafts 216, 218, 220.

Referring particularly to FIG. 11, the conveyor 200 comprises zig-zag flexible moulding sections each of which has a support surface 222, a bearing surface 224, and a lug 226 for engagement with a tensioning and drive chain 228. The support surface 222 rests on an outer flat portion 230 of the rim 210 of each wheel and the bearing surface 224 is pressed against an outwardly-facing inner flange 232 by the tension in the chain 228.

As shown in FIG. 10 each wheel 202 etc. supports the conveyor 200 over a length of arc, determined by the size and spacing of the wheels, so that the conveyor extends along a generally tangential path between successive wheels. Each wheel is inclined about the radial bisector of the arc of contact, in a manner similar to that of the system of FIG. 1, and the height of successive wheels is such that the conveyor progresses upwards (or downwards) around the wheels generally as indicated in FIG. 3. The bearings within the hubs 214 allow the necessary tilting of the wheels and the inclination is adjustably set by means of upper and lower rim guide wheels 234, 236 which contact the rims 210 of the wheels 202 etc. adjacent the ends of the arcs of contact of the conveyor 200 with the wheels, i.e. at the positions where the conveyor is respectively fed onto and off the wheels. As particularly shown in FIG. 11 the rim guide wheels 234, 236 are supported in pairs on a carrier 238 located at the outer end of an arm 340 which extends from and is supported by a mounting 241 on a respective shaft 216, 218 or 220. Each carrier 238 further carries a wheel or sprocket 242, coaxial with the upper rim guide wheel 234, to control the feed of the chain 228 onto and/or off the wheels 202 etc. It should be appreciated that no drive is imparted to the chain 228 through the sprocket 242, the latter merely ensuring correct positioning of the conveyor 200. The rim guide wheels 234, 236 (and the sprocket 242) are mounted in slots on the carrier 238, so that their location may be adjusted, as indicated by the arrows 244 in FIG. 11, to set the relative height and inclination of each of the wheels 202 etc.

The wheels 202, 204, 206 comprise an intermediate tier of the conveyor system. Cigarettes or other rod-like articles are transferred to or from the conveyor 200 on a short extension 245 which passes to a roller 246 from the lowermost wheel directly below the wheel 202. For example the extension 245 could lead onto the wheel 208 (FIG. 11). A band conveyor 248, passing around a roller 250 adjacent the roller 246, delivers articles to or receives articles from the system.

The conveyor 200 passes from the uppermost wheel of the system along a return path to the roller 246. The return path includes one or more sprockets which engage the chain 228 and which are driven to move the conveyor 200 and therefore the wheels 202 etc. An arrangement for tensioning the chain 228 similar to that shown in FIG. 9 may be used. Alternatively, a simpler arrangement, merely tensioning the chain to take up slack which appears (particularly in a loop between reversibly driven sprockets), may be used.

The internal diameters of the wheels 202 etc. may typically be 900 mm, the external diameters 1220 mm, and the spacing of their centers 700 mm. The number of wheels 202 etc. is variable but a system of convenient size for use as a reversible reservoir may have from four to six tiers each of three wheels. The capacity of such a system would be in the range 20–40,000 articles.

We claim:

1. A conveyor system for rod-like articles, comprising a laterally flexible conveyor having a support surface for rod-like articles in stack formation, a plurality of spaced laterally curved guide members defining a path for the conveyor, and means for mounting said members at different levels and so that they are at least partially inclined in the direction of the conveyor extending between them, said mounting means including means allowing pivotal movement of successive guide members respectively about axes lying substantially in the plane of said path at said member.

2. A conveyor system as claimed in claim 1, wherein at least successive guide members partly overlap.

3. A conveyor system for rod-like articles, comprising a laterally flexible conveyor having a support surface for rod-like articles in stack formation, and means including a plurality of spaced partly superposed laterally curved rotatable guide members for defining an inclined path for the conveyor, wherein successive guide members have overlapping portions off said path and are disposed at a first inclination, said path extending between said guide members being disposed at a second inclination, and the length of said path on each of said guide members exceeding the length of said path extending between said guide members.

4. A conveyor system as claimed in claim 3, wherein the guide members are movable with the conveyor.

5. A conveyor system as claimed in claim 3, wherein said path is generally helical.

6. A conveyor system as claimed in claim 3, including a plurality of vertically-spaced tiers, each tier comprising a plurality of guide members.

7. A conveyor system as claimed in claim 6, wherein the centers of curvature of the guide members lie on a helix.

8. A conveyor system for rod-like articles, comprising a laterally flexible conveyor having a support surface for rod-like articles in stack formation, and means including a plurality of spaced partly superposed laterally curved rotatable guide members in the form of rotatable wheels for defining an inclined path for the conveyor, wherein successive guide members are disposed at a first inclination, said path extending between said guide members being disposed at a second inclination, and the length of said path on each of said guide members exceeding the length of said path extending between said guide members, and means for adjusting the inclination of each wheel about a radial axis.

9. The conveyor system as claimed in claim 8, wherein the adjusting means comprises means engaging the periphery of the wheel at spaced locations.

10. A conveyor system as claimed in claim 3, wherein said guide members comprise rotatable wheels and said path defining means includes common support means for at least two vertically-spaced wheels.

11. A conveyor system as claimed in claim 3, wherein said guide members comprise rotatable wheels and wherein the conveyor passes around and is supported on a sector of the periphery of a wheel, the wheel being inclined about an axis which is the radial bisector of said sector.

12. A conveyor system as claimed in claim 3, wherein said rotatable guide members are wheels, and including means engaging said conveyor adjacent a wheel to control feed of the conveyor onto the wheel.

13. A conveyor system as claimed in claim 3, including means for reversibly driving said conveyor.

14. A conveyor system as claimed in claim 13, wherein said driving means engages said conveyor at a position not on said path.

15. A conveyor system as claimed in claim 13, wherein said conveyor comprises a laterally flexible support surface and a tensioning member, said driving means engaging said tensioning member.

16. A conveyor system as claimed in claim 13, wherein the driving means comprises first and second drive means engaging the conveyor at spaced positions with a short path section for said conveyor extending between said drive means, each of said drive means being arranged to drive said conveyor in a direction into said short path section, further including resilient tensioning means for said conveyor in said short path section.

17. A conveyor system as claimed in claim 13, adapted for use as a reservoir for rod-like articles, and including reversible conveyor means for transferring rod-like articles to and from the system.

18. A conveyor system as claimed in claim 3, including means for receiving rod-like articles on said conveyor at a first level and means for delivering rod-like articles from said conveyor at a second level.

19. A conveyor system as claimed in claim 2, wherein said guide members comprise rotatable wheels.

20. A conveyor system as claimed in claim 19, including a plurality of wheels arranged with their centers lying on a helix.

21. A conveyor as claimed in claim 20, wherein said conveyor passes around said wheels and is supported thereby on a sector of each wheel, said wheels being inclined about axes which are radial bisectors of said sector.

22. A conveyor system as claimed in claim 1, including means for individually setting the inclination of said guide members including means for fixing the pivotal position of said guide members about the respective pivotal axis of said mounting means.

23. A conveyor system as claimed in claim 2, wherein successive guide members comprise wheels rotatable about substantially parallel support members carrying said mounting means, said support members being spaced by a distance which is less than the sum of the radii of said wheels.

24. A conveyor system for rod-like articles, comprising a laterally flexible conveyor having a support surface for rod-like articles in stack formation, means including a plurality of rotatable guide wheels for defining a generally helical inclined path for said conveyor, successive wheels having overlapping portions off said path and being rotatable about axes which are relatively inclined so that said path is inclined on said wheels, and wherein the diameter and spacing of said wheels is such that the length of said path on a wheel exceeds that between said wheels.

25. A conveyor system for rod-like articles, comprising a laterally flexible conveyor having a support surface for rod-like articles in stack formation, means including a plurality of rotatable guide wheels for defining a generally helical inclined path for said conveyor, successive wheels being rotatable about axes which are relatively inclined so that said path is inclined on said wheels, and wherein the diameter and spacing of said wheels is such that the length of said path on a wheel exceeds that between said wheels, and means for moving the axis of rotation of individual wheels independently of the other wheels.

26. Apparatus as claimed in claim 25, wherein said axis moving means includes means for tilting a wheel about a further axis transverse to said axis.

27. A conveyor system for rod-like articles, comprising a laterally flexible conveyor having a support surface for rod-like articles in stack formation, and means including a plurality of spaced partly superposed laterally curved rotatable guide members for defining an inclined path for the conveyor, wherein successive guide members are disposed at a first inclination, said path extending between said guide members being disposed at a second inclination, and the length of said path of each of said guide members exceeding the length of said path extending between said guide members, said path curving in the same direction on said successive guide members.

28. A conveyor system for rod-like articles, comprising a laterally flexible conveyor having a support surface for rod-like articles in stack formation and means including a plurality of spaced laterally curved rotatable guide members for defining an inclined path for the conveyor, wherein successive guide members have overlapping portions off said path.

29. A conveyor system as claimed in claim 28, wherein successive guide members are at least partially inclined in the direction of said path.

* * * * *